United States Patent [19]
Kahlman

[11] Patent Number: 5,783,924
[45] Date of Patent: Jul. 21, 1998

[54] DRIVE SYSTEM COMPRISING A MOTOR, CONTROL MEANS FOR CONTROLLING THE MOTOR, APPARATUS COMPRISING THE DRIVE SYSTEM, AND METHOD OF CONTROLLING THE MOTOR

[75] Inventor: Josephus A. H. M. Kahlman, Eindhoven, Netherlands

[73] Assignee: U.S. Philips Corporation, New York, N.Y.

[21] Appl. No.: 759,663

[22] Filed: Dec. 6, 1996

[30] Foreign Application Priority Data

Dec. 21, 1995 [EP] European Pat. Off. .............. 95203586

[51] Int. Cl.[6] ................................................. G05B 19/29
[52] U.S. Cl. .................. 318/601; 318/798–815; 318/568.22
[58] Field of Search ............................. 318/798–815, 318/601, 568.22

[56] References Cited

U.S. PATENT DOCUMENTS

| | | | |
|---|---|---|---|
| 4,007,361 | 2/1977 | Martin | 318/611 X |
| 4,200,827 | 4/1980 | Oswald | 318/561 |
| 4,618,808 | 10/1986 | Ish-Shalom et al. | 318/568.22 X |
| 4,663,575 | 5/1987 | Juzswik et al. | 318/601 X |
| 5,300,873 | 4/1994 | Otani et al. | 318/807 |

Primary Examiner—Karen Masih
Attorney, Agent, or Firm—Edward Blocker

[57] ABSTRACT

The drive system (210) comprises an electronically commutated motor (220) having three windings (225, 226 and 227). The motor (220) is energized by an energizing circuit (270). The energizing means (270) is controlled by three Hall elements (241, 242 and 243) which supply sensor signals ($H_1$, $H_2$ and $H_3$). The motor comprises a permanent-magnetic part whose position is measured by means of the Hall elements. The drive system (210) comprises a status generator (280) which generates status signals ($Q_1$, $Q_2$, $Q_3$ and $Q_4$) which are dependent upon the ratio between the actual values of the sensor signals ($H_1$, $H_2$ and $H_3$). The drive system (210) further comprises a multiplexer (290) and an inverter (295) which are controlled by the status signals ($Q_1$, and $Q_2$, respectively) in order to generate a position signal (P). A corrected position signal (P') is applied to a comparator (260) to generate an error signal (E). By means of this comparator (260) the corrected position signal (P') is compared with a reference value (R) generated by the sawtooth generator (250). The sawtooth generator (250) comprises a digital counter which indicates the reference value (R) and which is decremented by a step size (dR) at a step frequency (f). The output of the comparator (260) is connected to the energizing circuit (270) via a loop filter (295). The reference value (R) is adapted to transients in the position signal. For this purpose, the drive system (210) includes a multiplier (205) and a switch (206). A transient occurs when the multiplexer (290) or the switch (296) is switched over.

12 Claims, 6 Drawing Sheets

5,783,924

1

DRIVE SYSTEM COMPRISING A MOTOR, CONTROL MEANS FOR CONTROLLING THE MOTOR, APPARATUS COMPRISING THE DRIVE SYSTEM, AND METHOD OF CONTROLLING THE MOTOR

BACKGROUND OF THE INVENTION

The invention relates to a drive system comprising a motor, a first part, a second part driven relative to the first part by means of the motor, and control means comprising a measurement system for generating a position signal which is dependent on the position of the first part relative to the second part, reference means for generating a reference value, a comparator for generating an error signal which is a measure of the difference between a parameter of the position signal and the reference value, and energizing means for energizing the motor in dependence upon the error signal.

The invention also relates to control means for use in such a drive system.

Moreover, the invention relates to an apparatus for storing and/or reproducing information, comprising such a drive system.

The invention further relates to a method of controlling a motor in such a drive system.

Such a drive system is known from U.S. Pat. No. 5,300,873. The known drive system comprises an electronically commutated motor having a permanent-magnet rotor. The position of the rotor is detected by means of three Hall elements, with which a position signal is generated. The position signal is digitized and the period and phase of the digitized position signal are determined by means of a microprocessor and a comparator code stored in a memory. A comparator compares the detected period and phase with a period and phase stored in the memory. The comparison result is used in order to generate a signal for energizing the motor. If desired, the detected period can be utilized to effect speed control. A disadvantage of the known drive system is that it requires a comparatively large memory and a certain rotor speed in order to determine the phase and the period of the sensor signals. Another disadvantage of the known drive system is that position changes cannot be controlled. A further disadvantage of the known system is that the speed control is only suitable for use in conjunction with an electronically commutated motor.

OBJECTS AND SUMMARY OF THE INVENTION

It is an object of the invention to provide a drive system which requires only a small memory. It is another object of the invention to provide a drive system which is controllable over a large speed range and a large range of positions. To this end, the drive system in accordance with the invention is characterized in that the position signal as a function of the position is a waveform having exclusively monotonically increasing or exclusively monotonically decreasing waveform portions with a transient between every two adjacent waveform portions, an error signal is generated that is a measure of the difference between the actual value of the position signal, ana a reference value the difference between the actual value of the position signal, and a reference valve the control means are adapted to generate a switching signal upon the occurrence of a transient (abrupt transition) in the position signal, and the reference means are adapted to be responsive to said switching signal to subject the reference value to a correction of the same magnitude and sign as said transient. The generation of the error signal requires hardly any storage capacity because this error signal depends only on the actual position signal and the actual reference value. Preferably, the position signal as a function of the position is comparatively steep, so that comparatively small position changes result in a comparatively large error signal, enabling the motor to be controlled more accurately. The transients in the position signal enable an infinitely large range of positions to be obtained with a high steepness and a limited swing of the position signal. By selecting a reference value which deviates from the actual position signal the motor will be energized as long as the position signal is not equal to the reference signal. A second part driven by the motor relative to a first part is then driven in such a direction that the position signal will change toward the reference value. When the selected reference value outranges the swing of the position signal a number of transients will be passed the reference value being always adapted at the instant at which a transient occurs. As a result, it is achieved that the transients in the position signal do not affect the error signal, thereby assuring a uniform energization of the motor and, as a consequence, a uniform drive. The energization of the motor is dependent on the difference between the reference value and the actual position signal, so that changes in the reference value lead to corresponding position changes of the driven second part. Thus, the reference value enables both the absolute position change and the rate of the position change to be controlled.

An embodiment of the drive system in accordance with the invention is characterized in that the reference means are adapted to generate a reference value in dependence upon time and a target signal. This target signal may represent, for example, a desired speed, the reference value for example increasing as a function of time and the rate of increase being determined by the value of the target signal. As a result, the error signal will increase until the rate at which the position signal increases has become equal to the rate of increase of the reference value. In this way speed control is achieved for the drive system in accordance with the invention. The increase of the reference value can also be derived from a table which stores a given variation. This variation can be, for example, a sinusoidal variation. The target signal may alternatively represent a desired acceleration. In that case the reference value will increase as a linear function of the target signal and as a quadratic function of time.

An embodiment of the drive system in accordance with the invention is characterized in that the position signal as a function of the position is a sawtooth-shaped waveform, the reference means comprise a digital counter which indicates the reference value and which is incremented or decremented with a step size at a step frequency and the step size and/or the step frequency depend(s) on the target signal. This embodiment is very interesting because of its simplicity. Such a sawtooth-shaped signal can be generated, for example, by means of a optical or a capacitive position detector. In the case of a sawtooth-shaped position signal the reference value can be obtained by means of a simple digital counter. Moreover, such a counter has the advantage that the reference value can be adapted to a transient in the position signal simply by adding the magnitude of this transient to the actual value of the counter. By making the target signal correspond to a desired speed this embodiment provides a speed control which yields a uniform drive starting from zero speed.

An embodiment of the drive system in accordance with the invention is characterized in that the measurement system comprises at least two sensors for supplying a sensor signal which is dependent upon the position of the second part relative to the first part, the control means comprise a status generator for generating a status signal in dependence upon the actual values of the sensor signals, and the control means comprise a multiplexer for deriving the position signal from the sensor signals in dependence upon the status signal. As a result of these measures, the range of positions is covered by a plurality of sensors, so that a more accurate position signal is generated, while irregularities in the position signal caused by multiplexing of the different sensor signals do not affect the error signal and always a uniform drive is assured. The status signal can continually indicate which sensor is used. This information can be used not only for adapting the reference value to a transient in the position signal but also for adapting the variation of the reference value to, for example, the slope of the sensor signal as a function of position corresponding to the sensor used. This variation can be adapted, for example, by adapting the increase of the reference value as a function of time or by adapting the dependence on the target signal.

An embodiment of the drive system in accordance with the invention is characterized in that each of the sensors comprises a Hall element on the first part and a permanent magnet on the second part and that adjacent the Hall elements flux guides have been provided to guide the flux of the permanent magnet. A Hall element is very suitable for the drive system in accordance with the invention because a Hall system operates without mechanical contact, is not sensitive to dust, and supplies a sensor signal which is independent of the speed of the magnet relative to the Hall element. By arranging flux guides adjacent the Hall elements the sensor signal becomes substantially linear in a given range of positions. By using a plurality of Hall elements and forming a position signal from the linear parts of the sensor signals from the Hall elements a position signal can be obtained which is suitable for controlling position changes or for speed control, as described hereinbefore. An advantage of the use of Hall elements is that in many motor types the rotor takes the form of a permanent magnet, so that only Hall elements and, if required, flux guides have to be added. Some motor types already comprise Hall elements to control an electronic commutation circuit. It has been found that these Hall elements are suitable for generating a position signal in a drive system in accordance with the invention.

An embodiment of the drive system in accordance with the invention is characterized in that the motor comprises a drivable part which comprises the permanent magnet, the motor further comprises stator poles carrying windings, each Hall element is disposed in a plane of symmetry of a stator pole, and the measurement system comprises first correction means for correcting for crosstalk from a first stator pole to a Hall element facing a second stator pole by means of a compensation signal which is directly proportional to the current through the winding associated with the first stator pole. Since each stator pole generates a magnetic field which is dependent on the current through the winding associated with the respective stator pole, this magnetic field can produce crosstalk in the position signal. This crosstalk can be reduced by means of the specified measures. By arranging each Hall element in a plane of symmetry of a stator pole there will be substantially no crosstalk of the magnetic field from this stator pole to the respective Hall element in the case of a correct orientation of the Hall elements. Generally, the Hall elements will not be disposed symmetrically relative to adjacent stator poles, as a result of which the magnetic field of these stator poles will produce crosstalk. This crosstalk is corrected by correction means, which generates a correction signal whose relationship with the current through the winding of the adjacent stator poles is determined simply by experiment.

An embodiment of the drive system in accordance with the invention is characterized in that the measurement system comprises a memory for storing the maximum value and the minimum value of each of the sensor signals, and the measurement system comprises second correction means for correcting each sensor signal on the basis of the stored values. The amplitudes of the sensor signals may differ from one another as a result of production tolerances or drift. Moreover, a sensor signal may have or acquire an offset during the life of the sensor. Such amplitude differences and offsets can be detected easily by storing the maximum and minimum values of each of the sensor signals. These amplitude differences and offsets can be corrected by means of a digital circuit or by means of analog dividers and comparators so as to obtain a position signal of better quality.

An apparatus in accordance with the invention for the storage and/or reproduction of information comprises a head for writing information on an information carrier and/or reading information stored on an information carrier and a drive system in accordance with the invention for positioning the head relative to the information carrier. In the case that the information carrier is a tape, the drive system is used, for example, to drive a reel hub onto which the tape is wound. In the case that the information carrier is a disc, the drive system is used, for example, to move the head in a radial direction relative to the disc. The access time of a such an apparatus is the average time needed before a piece of information can be read or written. Generally, it is necessary to locate a given position on the tape or disc before reading or writing can begin. For reading or writing information, the tape or the head should be driven with a comparatively low speed of transport. For locating a given position on the tape or disc the tape or the head should be driven with a comparatively high speed of transport. In order to obtain a short access time the transition between the comparatively high speed of transport and the comparatively low speed of transport should be short. This transition should also be smooth, particularly in the case of a tape transport, because a tape may be deformed when driven irregularly. The access time is one of the most important items in the specification of an apparatus for storing and/or reproducing information. The measures in accordance with the invention yield a substantial improvement of the specification in this respect.

The method in accordance with the invention concerns a method of controlling a motor in a drive system having a first part and a second part driven relative to the first part by means of the motor, the method comprising the steps of: generating a position signal which is dependent upon the position of the second part relative to the first part, generating a reference value, adapting the reference value upon the occurrence of a transient in the position signal by applying a correction of the same magnitude and sign as said transient, generating an error signal which is a measure of the difference between the actual value of the position signal and the reference value, and energizing the motor in dependence upon the error signal. This method yields the same advantages as described hereinbefore.

BRIEF DESCRIPTION OF THE DRAWINGS

The above and other aspects of the invention will be described in more detail, by way of example, with reference to the drawings, in which.

DETAILED DESCRIPTION OF THE PREFERRED EMBODIMENTS

Figure 1:
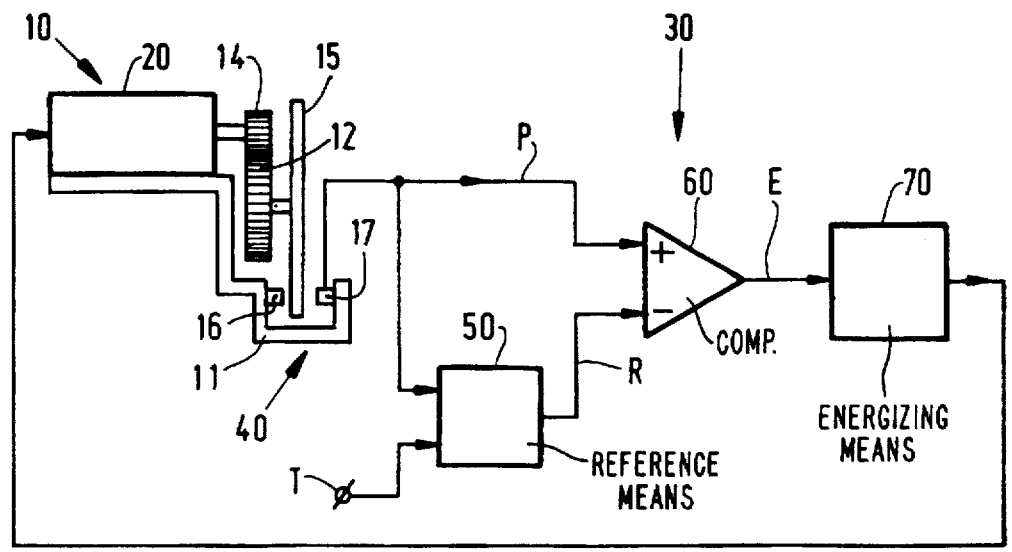
FIG. 1 shows diagrammatically a first embodiment of the drive system in accordance with the invention.

FIG. 1 shows diagrammatically a first embodiment of the drive system in accordance with the invention. The drive system 10 comprises a motor 20 secured to a first part, in the present case a chassis 11. The motor 20 has been provided with a pinion 14 for driving a second part, in the present case a toothed wheel 12. The drive system 10 includes control means 30. The control means 30 comprise a measurement system 40, reference means 50, a comparator 60 and energizing means 70 for energizing the motor 20. The measurement system 40 comprises an optical disc having a varying optical transmission system at its circumference. The chassis 11 carries a light-emitting element 16 at one side of the disc 15 and a light-sensitive sensor 17 at the other side of the disc 15. The optical disc 15 is non-rotatably coupled to the toothed wheel 12. The light-sensitive sensor 17 receives a greater or smaller amount of light depending on the rotary position α of the toothed wheel 12. A position signal P is generated in that the light-sensitive sensor 17 converts the amount of light thus received into an electric signal.

Figure 2A:
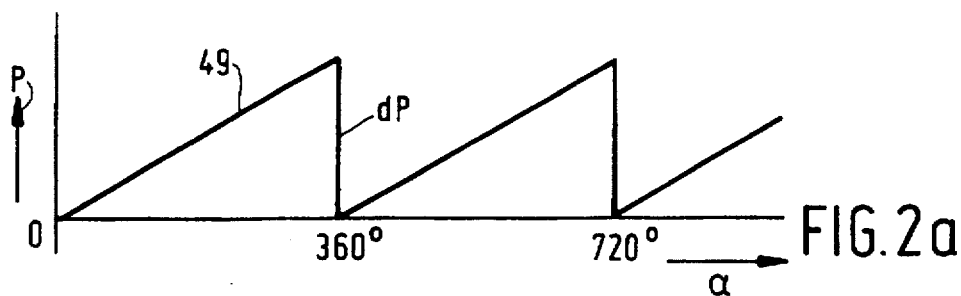
FIG. 2 shows the position signal, the reference value and the error signal in the case of the first embodiment.
Figure 2B:
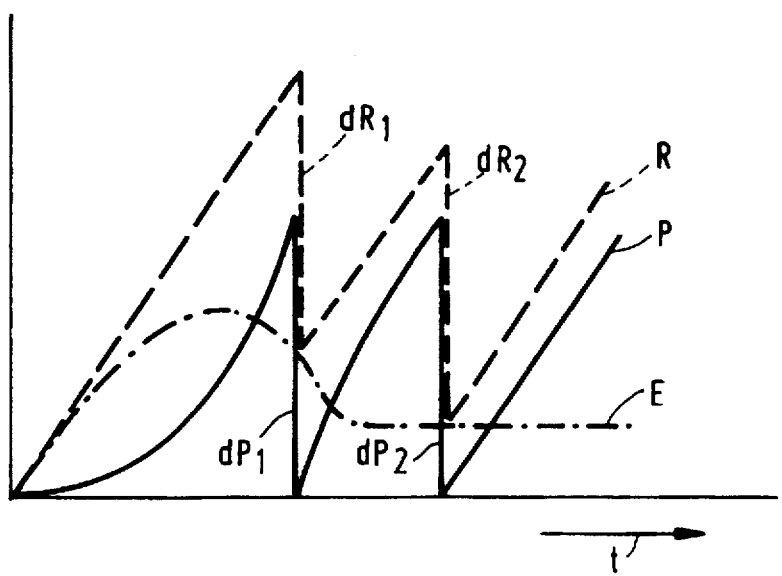

FIG. 2a shows this position signal P as a function of the rotary position α of the toothed wheel 12 in the case that the optical disc 15 has a transmission coefficient which varies linearly from 0 to a given value. The reference means 50 are adapted to generate a reference value which increases linearly as a function of the time t (see FIG. 2b). The comparator 60 generates an error signal E which is a measure of the difference between the actual value of the position signal and the reference value (see FIG. 2b). This error signal E is applied to the energizing means 70, which energize the motor 20 in dependence upon the error signal E, in the present case by supplying a current which is directly proportional to the error signal E. After a period of 360° in which the position signal has increased from 0 to a given value, the position signal will jump back to 0 because the optical disc 15 again occupies its initial position. This results in a transient having a magnitude dP1 (see FIG. 2b) in the position signal P. Without any additional measures this transient would affect the error signal E and the current supplied to the motor 20 by the energizing means 70. Such a transient in the motor current would lead to an irregular drive. Such an irregular drive is precluded by the following measures. The position signal P is also applied to an input of the reference means 50. The reference means 50 include an edge detector which generates a switching signal upon the appearance of a transient dP1 in the position signal. In response to this switching signal the reference value R is adapted by a correction dR1 of the same magnitude and sign as the transient dP1. As a result of this, the position signal P and the reference value R both exhibit a transient of the same magnitude and sign at the same instant, as a result of which the error signal E exhibits no transients and the motor 20 is driven with a uniform speed. The reference means 50 are adapted to generate a reference value R which is dependent upon time and upon a target signal T. This target signal T can be, for example, a desired speed. In that case the reference value R is increased as a linear function of time and the rate of increase is then directly proportional to the target signal T. In that case the drive system operates as follows. For a given speed setting the reference value R will increase as a linear function of time. In the case of a deviation between the actual values of the position signal P and the reference value R a non-zero error signal E will be generated. This results in a current through the motor 20, which is supplied by the energizing means 70. If the reference value R increases more rapidly as a function of time than the position signal P, the value of the error signal E will increase and, as a consequence, the current through the motor 20 will also increase. As a result of this, the rate of increase of the position signal P will also increase, causing the value of the error signal E to decrease after some time. In the case of a correct setting of the loop gain of this loop the position signal P will increase at the same rate as the reference value R after some time. The error signal E will then assume a constant value and the energizing means will supply a constant current to the motor 20. Thus, a speed control loop is obtained.

The measurement system 40 shown in FIG. 1 is adapted to generate a position signal P as a function of the position α, which signal consists of a waveform having exclusively monotonically rising waveform portions 49 (see FIG. 2a). The position signal P shown in FIG. 2a exhibits linearly increasing waveform portions 49 such that the transition between two adjacent waveform portions is formed by a transient having a magnitude dP. However, it is also possible that the waveform portions 49 comprise a monotonic portion of a sinewave. In that case the most uniform drive is obtained by also making the reference signal dependent upon time in accordance with a similar portion of a sinewave. Obviously, it is also possible to use only monotonically decreasing instead of monotonically increasing waveform portions because, in fact, this is merely an inversion.

Figure 3:
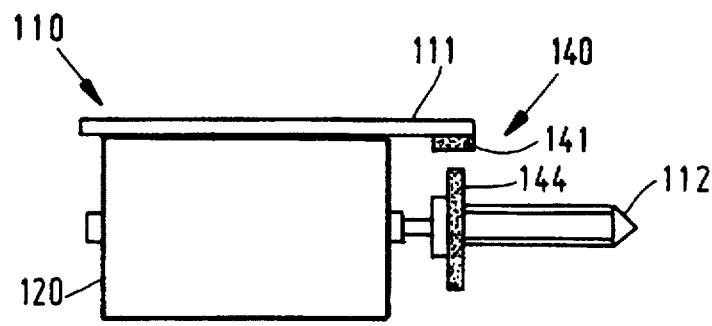
FIG. 3 is a side view showing a motor and a part of a measurement system for use in a second embodiment of the drive system in accordance with the invention.
Figure 4:
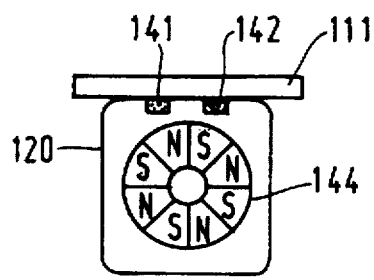
FIG. 4 is a front view of the elements shown in FIG. 3.

FIG. 3 shows a part of a second embodiment of the drive system in accordance with the invention. The drive system 110 comprises a motor 120 mounted on a first part in the present case a printed circuit board 111. The motor drives a second part, in the present case a worm wheel 112 connected to a magnet ring 144. Two Hall sensors 141 and 142 are mounted on the printed circuit board 111 near the magnet ring 144 (see FIG. 4). The motor 120 is a simple brush motor, which is suitable for positioning a head relative to an information carrier in an as claimed in an apparatus in accordance with the invention.

Figure 5:
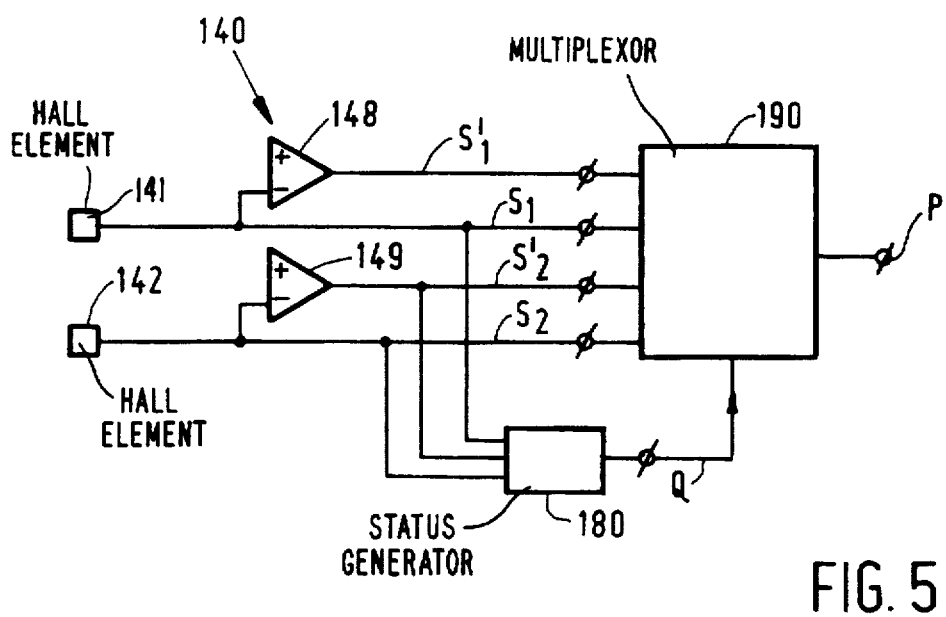
FIG. 5 shows diagrammatically a measurement system belonging to the second embodiment.

FIG. 5 shows a measurement system 140 belonging to the second embodiment of the invention. The sensor signals $S_1$ and $S_2$ generated by the Hall elements 141 and 142, respectively, are applied to a multiplexer 190. The inverted sensor signals $S'_1$ and $S'_2$ are generated by means of inverting amplifiers 148 and 149. These inverted sensor signals $S'_1$ and $S'_2$ are also applied to an input of the multiplexer 190. The sensor signals $S_1$ and $S_2$ are also applied to a status generator 180. This status generator 180 generates a status signal Q which depends on the actual values of the sensor signals $S_1$, $S_2$ and $S'_2$. This status signal Q is applied to the multiplexer 190, which transfers one of the inverted or non-inverted sensor signals to the output in dependence upon the status signal Q. On the output of the multiplexer 190 this results in a position signal P, which is further processed as already described for the preceding embodiment.

Figure 6:
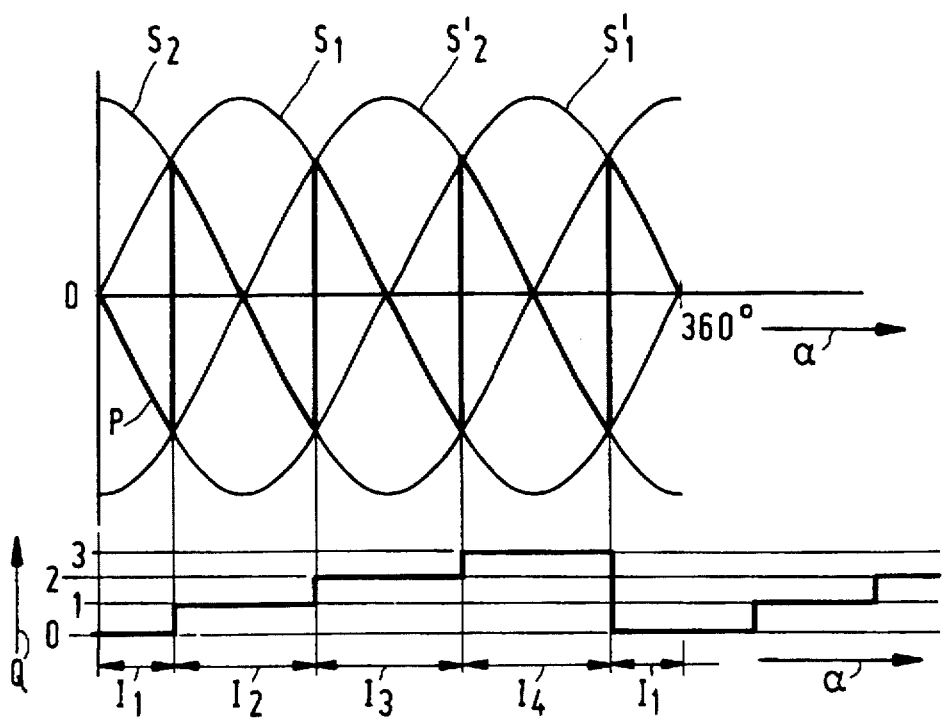
FIG. 6 shows sensor signals, a position signal and a status signal in the case of the second embodiment.

FIG. 6 shows the sensor signals $S_1$, $S_2$, $S'_1$ and $S'_2$, the position signal P and the status signal Q as a function of the position $\alpha$ in the case of the second embodiment. In a first interval $I_1$, in which $S_1$ is smaller than $S_2$ and $S_1$ is greater than $S'_2$, the status signal Q has the value 0 and $S'_1$ is transferred to the output of the multiplexer 190 (see FIG. 5). In a second interval $I_2$, in which $S_1$ is greater than $S_2$ and $S_1$ is greater than $S'_2$, the status signal Q has the value 1 and $S_2$ is transferred to the output of the multiplexer 190. In a third interval $I_3$, in which $S_1$ is greater than $S_2$ and $S_1$ is smaller than $S'_2$, the status signal Q has the value 2 and $S_1$ is transferred to the output of the multiplexer 190. In a fourth interval $I_4$, in which $S_1$ is smaller than $S_2$ and $S_1$ is smaller than $S'_2$, the status signal Q has the value 3 and $S'_2$ is transferred to the output of the multiplexer 190. As can be seen in FIG. 6, a sawtooth-shaped position signal, which is a function of the position $\alpha$, is generated on the output of the multiplexer 190.

Figure 8:
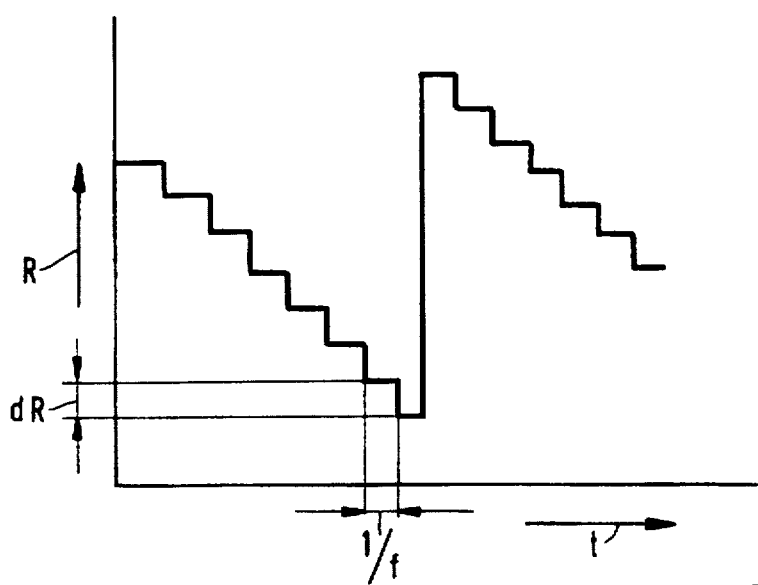
FIG. 8 shows the reference value as a function of time in the case of the third embodiment.
Figure 7:
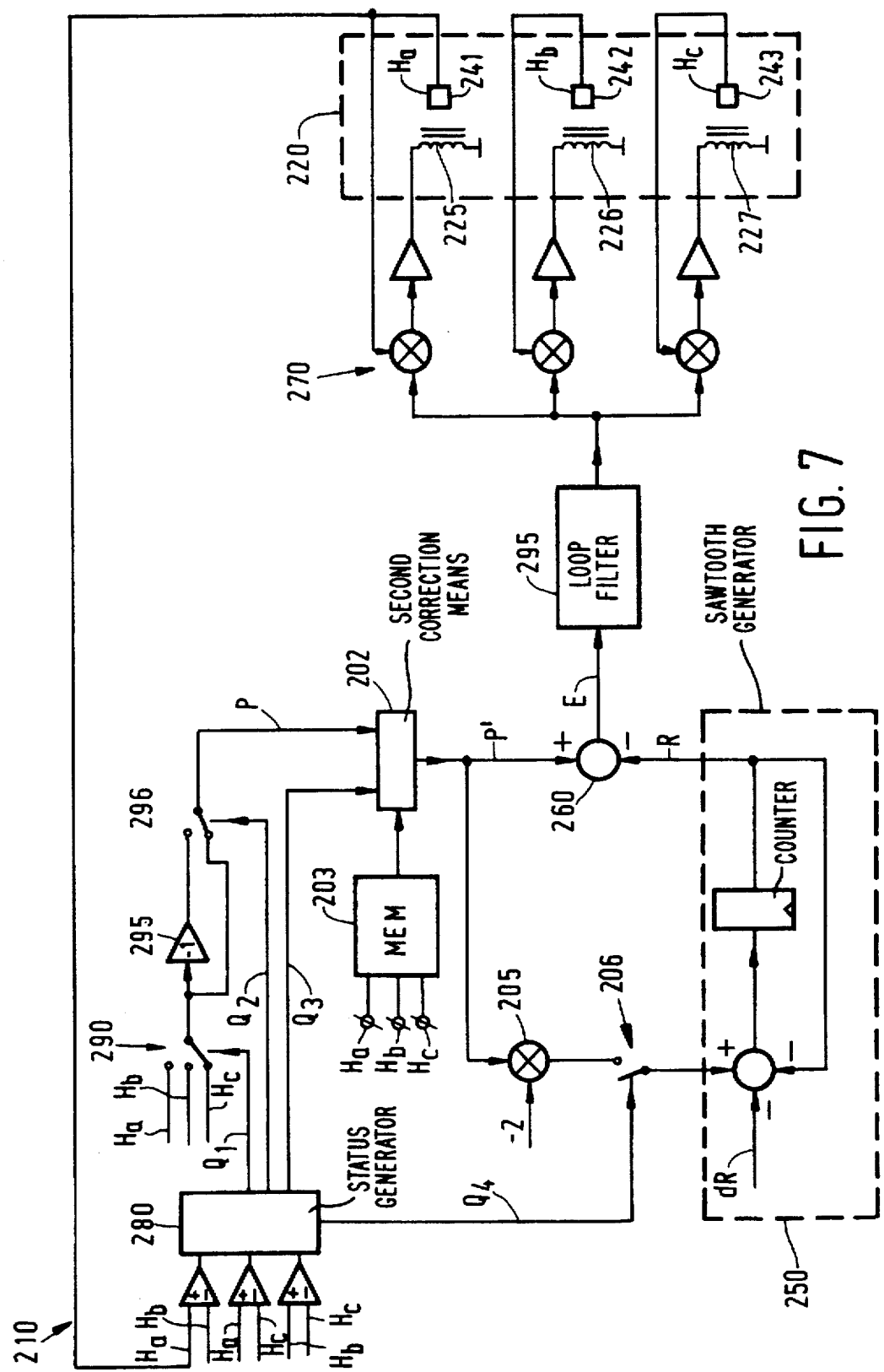
FIG. 7 shows diagrammatically a third embodiment of the drive system in accordance with the invention.

FIG. 7 shows diagrammatically a third embodiment of the drive system in accordance with the invention. The drive system 210 comprises an electronically commutated motor 220 having three windings 225, 226 and 227. The motor 220 is energized by energizing means 270. The energizing means 270 are controlled by three Hall elements 241, 242 and 243, which supply sensor signals $H_a$, $H_b$ and $H_c$. The motor comprises a permanent-magnetic part 244 (see FIG. 12) which is drivable by means of the windings 225, 226 and 227 and whose position is measured by means of said Hall elements. The drive system 210 comprises a status generator 280, which generates status signals $Q_1$, $Q_2$, $Q_3$ and $Q_4$, which are dependent on the ratio between the actual values of the sensor signals $H_a$, $H_b$ and $H_c$. The drive system 210 further comprises a multiplexer 290 and an inverter 295, which are controlled by the status signals $Q_1$ and $Q_2$, respectively, to generate a position signal P. The drive system 210 further comprises a memory 203 for the storage of the maximum value and the minimum value of each of the sensor signals $H_a$, $H_b$ and $H_c$. By means of (second) correction means 202 the generated position signal P is corrected for amplitude differences of the different sensor signals $H_a$, $H_b$ and $H_c$ and offsets in these sensor signals on the basis of the stored maximum and minimum values (see the description with reference to FIGS. 10 and 11). The position signal P' thus corrected is applied to a comparator 260 for the generation of an error signal E. By means of this comparator 260 the corrected position signal P' is compared with a reference value R, which is generated by the sawtooth generator 250. The sawtooth generator 250 comprises a digital counter which indicates the reference value R and which is decremented by a step size dR with a step frequency f (see FIG. 8). The output of the comparator 260 is connected to energizing means 270 via a loop filter 295. The loop filter 295 serves to stabilize the control loop thus formed in a manner known per se. As already described for the first embodiment, the reference value R in the third embodiment is also adapted to transients which occur in the position signal when the multiplexer 290 or the switch 296 is switched.

Figure 9:
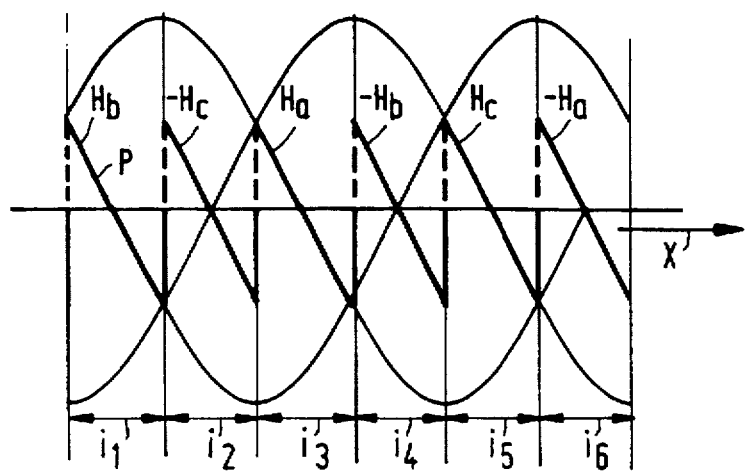
FIG. 9 shows sensor signals and a position signal in the case of the third embodiment.

FIG. 9 shows the sensor signals $H_a$, $H_b$ and $H_c$ and the position signal P derived therefrom. In a first interval $i_1$, $H_a$ is greater than $H_b$ and $H_b$ is greater than $H_c$. On the basis of this condition P is made equal to $H_b$. In a second interval $i_2$, $H_a$ is greater than $H_c$ and $H_c$ is greater than $H_b$, on the basis of which P is made equal to $-H_c$. In a third interval $i_3$, $H_a$ is greater than $H_b$ and $H_c$ is greater than $H_a$, on the basis of which P is mode equal to $H_a$. In a fourth interval $i_4$, $H_b$ is greater than $H_a$ and $H_c$ is greater than $H_b$, on the basis of which P is mode equal to $-H_b$. In a fifth interval $i_5$, $H_c$ is greater than $H_a$ and $H_b$ is greater than $H_c$, on the basis of which P is mode equal to $H_c$. In a sixth interval $i_6$, $H_a$ is greater than $H_c$ and $H_b$ is greater than $H_a$, on the basis of which P is mode equal to $-H_a$. Thus, switching between two sensor signals is effected each time that these sensor signals are equal to one another. On the basis of this, the reference value R can be adapted simply by multiplying the position signal P by a factor of $-2$ and by adding the value thus obtained to the value of the sawtooth generator 250 at the instant of switching over between two sensor signals. For this purpose, the drive system 210 comprises a multiplier 205 and a switch 206.

Figure 10:
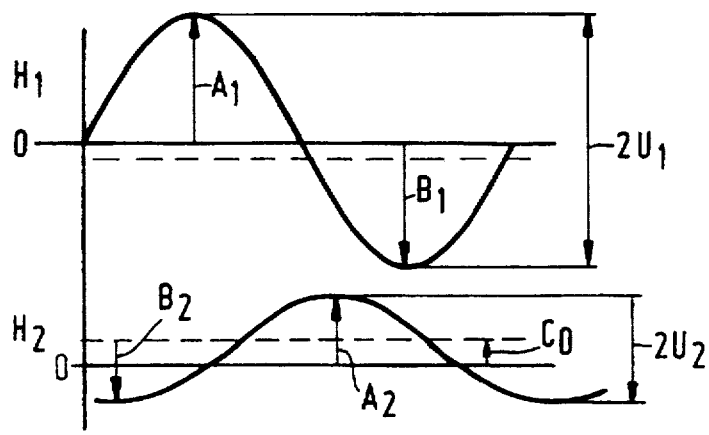
FIG. 10 shows sensor signals with different amplitudes and an offset.
Figure 11:
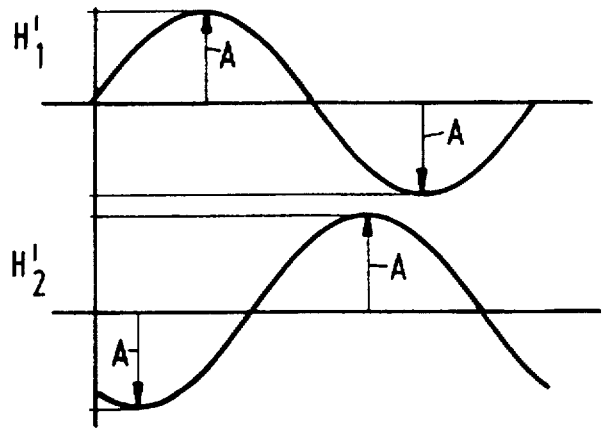
FIG. 11 shows corrected sensor signals.

FIG. 10 shows, by way of example, two sensor signals $H_1$ and $H_2$ from two sensors which supply different signals as a result of production tolerances. The sensor signals have different amplitudes $U_1$ and $U_2$ and the sensor signal $H_2$ also has an offset C. The amplitude $U_1$ is determined by the maximum value $A_1$ and the minimum value $B_1$ of the sensor signal $H_1$ in a memory. This is likewise effected for the sensor signal $H_2$. The stored values $A_2$ and $B_2$ are used in order to determine the offset C in the sensor signal $H_2$. On the basis of the amplitudes $U_1$ and $U_2$ and the offset C thus determined, the sensor signals $H_1$ and $H_2$ are converted into corrected sensor signals $H_1'$ and $H_2'$, as shown in FIG. 11, by the second correction means 202 shown in FIG. 7. The corrected sensor signals $H_1'$ and $H_2'$ are offset-free and have equal amplitudes. As a result of this, the quality of the position signal is improved.

Figure 12:
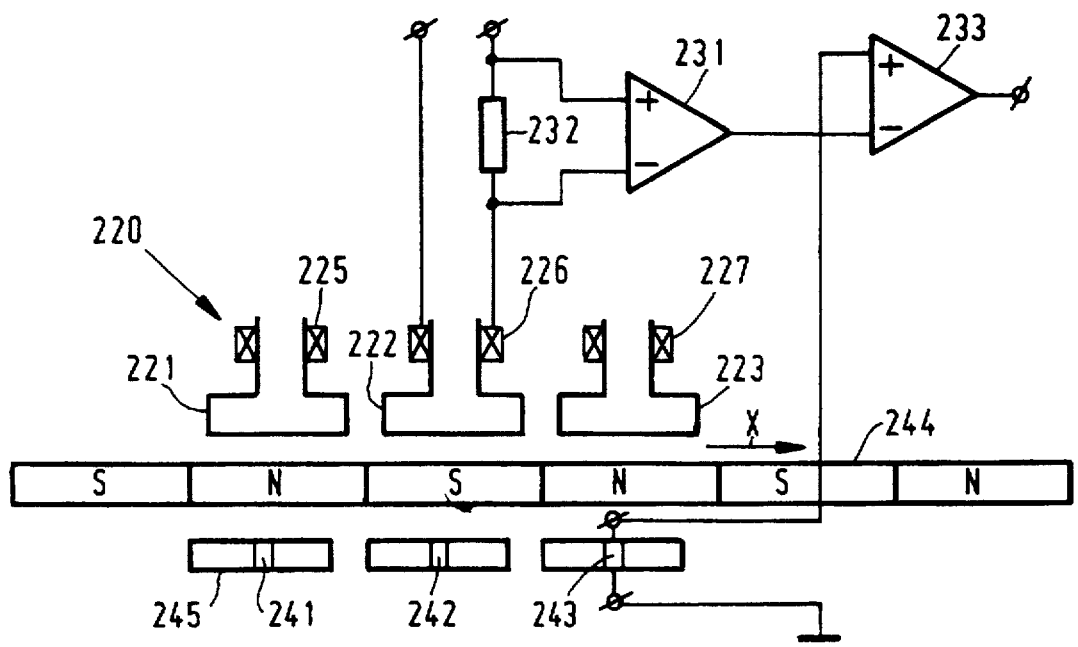
FIG. 12 shows diagrammatically a part of the drive system in accordance with the third embodiment.

FIG. 12 shows diagrammatically a part of the motor 220 as shown in FIG. 7 and a part of the associated measurement system. The motor 220 is shown as a linear motor. However, the measures disclosed can alternatively be applied to a rotary motor. The motor 220 has stator poles 221, 222 and 223. Each of the stator poles 221, 222 and 223 carries windings 225, 226 and 227. Three Hall elements 241, 242 and 243 are each disposed in a plane of symmetry of a stator pole. A drivable part comprising a permanent magnet 244 is situated between the stator poles and the Hall elements. The permanent magnet 244 can be driven by energizing the windings 225, 226 and 227 with three sinusoidal currents which differ 120° with one another. The measurement system comprises first correction means for the correction of crosstalk from the stator pole 222 to the Hall element 243. The correction means comprise a differential amplifier 231, which measures the voltage across a resistor 232 connected in series with the winding 226. The differential amplifier 231 generates a compensation signal which is directly proportional to a current through the winding 226. A second differential amplifier 223 subtracts the compensation signal from the sensor signal supplied by the Hall element 243. This is because the current through the winding 226 produces a magnetic field, which causes crosstalk in the sensor signal generated by the Hall element 243. This crosstalk can be eliminated largely by selecting an appropriate value for the resistor 232 by experiment. For the other Hall elements 241 and 242 a similar correction technique is applied, but this is not shown in FIG. 12 for the sake of clarity Each of the Hall elements 241, 242 and 243 shown in FIG. 12 has flux guides 245 arranged at both sides. These flux guides 245 guide the flux emanating from the permanent magnet 244. Depending on the position of the permanent magnet 244 relative to the flux guides 245 the flux passing through the Hall elements 241, 242 and 243 increases or decreases.

Figure 13:
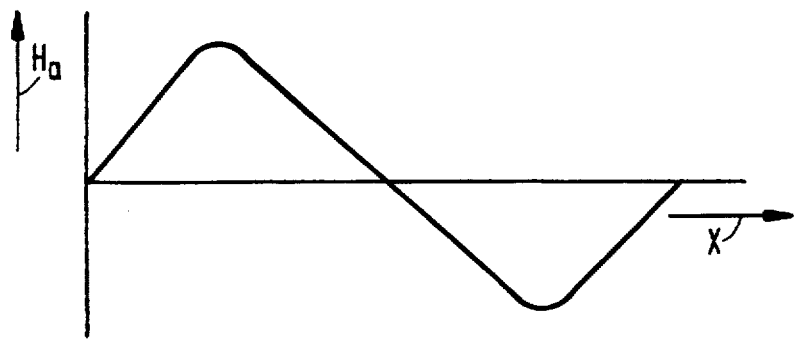
FIG. 13 shows a sensor signal in the case that flux guides are used.

FIG. 13 shows the sensor signal $H_a$ from the Hall element 241 as a function of the relative position X of the permanent magnet 244 with respect to the Hall element 241 in the case that flux guides 245 as shown in FIG. 12 are used. The permanent magnet 244 has been magnetized in blocks. The use of the flux guides 245 makes the sensor signal $H_a$ linearly dependent on the relative position X over a large range. After multiplexing of the sensor signals this results in a position signal which is sawtooth-shaped.

Figure 14:
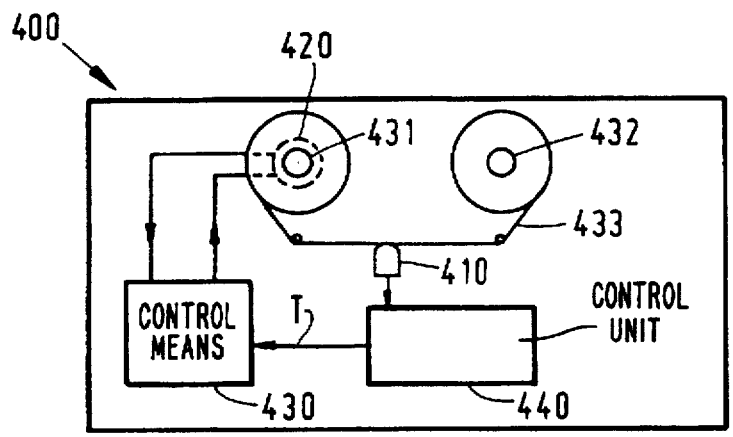
FIG. 14 shows an apparatus for the storage and/or reproduction of information.

FIG. 14 shows diagrammatically an apparatus for the storage and/or reproduction of information. The apparatus 400 comprises a head 410 for writing and reading information on/from an information carrier, in the present case a tape 433. The tape 433 is wound onto reel hubs 431 and 432 and can be positioned relative to the head 410 by driving the reel hub 431 by means of a motor 420. The apparatus 400 further comprises control means 430 which together with the motor 420 form a drive system in accordance with the invention. The control means 430 receive a target signal T from a control unit 440. This target signal T represents a desired speed of rotation of the reel hub 431. For example, if certain pieces of information are to be read from the tape 333 the control unit 440 will determine the actual position relative to the tape 433 by means of the head 410 by supplying a target signal T, the tape 433 being moved past the head 410 with a read speed. Depending on the actual position and the desired position of the head 410 relative to the tape 433, the control unit 440 will increase the target signal in accordance with a uniform curve, as a result of which the speed of transport of the tape 433 is increased uniformly. Likewise, the speed of transport of the tape 433 will be reduced to a speed at which the head 410 can read information from the tape when the desired position on the tape is approached. By means of the drive system in accordance with the invention the control unit 440 is capable of moving the tape 433 both with a comparatively low and a comparatively high speed of transport without any mechanical switching operations being required. It has been found that by means of an apparatus in accordance with the invention the speed of transport of the tape 433 can be raised from 2.5 cm/s to 10 m/s within a few seconds without the tape 433 being damaged. To drive the tape 433 in the opposite direction the reel hub 432 is also provided with a drive system in accordance with the invention.

For accurately positioning the tape 433 relative to the head 410 the reference value in the drive system in accordance with the invention can also be applied directly from the control unit 440. In that case the drive system in accordance with the invention in conjunction with the head 410 and the control unit 440 operates as a position servo loop.

The method described above may be carried out by the apparatus of FIGS. 1, 3-5, 7, 12 and 14. The method is described below with respect to the apparatus of FIG. 1 only. The method as carried out by the apparatus of FIGS. 3-5, 7, 12 and 14 will be apparent to those of skill in the art from the disclosure herein. Referring to FIGS. 1-3, a method of controlling motor 20 in the drive system 10 to drive the second part 12 relative to the first part 11 comprises the steps of generating the position signal P which is dependant upon the position of the second part 12 relative to the first part 11, generating a reference value R, adapting the reference value upon an occurrence of a transient dP1, dP2, having a magnitude and sign, in the position signal by applying a correction dR1, dR2 of a magnitude and sign the same as the magnitude and sign of the transient, generating an error signal E which is a measure of a difference between an actual value of the position signal and the reference value R, and energizing the motor 20 in dependence upon the error signal E.

The invention has the advantage that accurate and rapid position changes of a driven part over a large range of positions can be realized by comparatively simple means.

It is to be noted that the invention is not limited to the embodiments disclosed herein. Several other embodiments are possible without departing from the scope of the invention. For example, the control means may for the greater part be formed by a digital signal processor programmed in conformity with the measures in accordance with the invention. As already stated, the drive system in accordance with the invention can also be used for moving a head in a radial direction relative to a disc-shaped information carrier. The drive system in accordance with the invention can also be used for moving a head relative to a tape in a direction perpendicular to the direction of transport of the tape. Another field of use where the drive system in accordance with the invention can be used with great advantages is in the field of automatic assembly systems. This field covers inter alia industrial robots and component placement systems by means of which components are mounted on printed circuit boards.

I claim:

1. A drive system comprising a motor, a first part, a second part driven relative to the first part by means of the motor, and control means comprising measurement system for generating a position signal which is dependant on a position of the first part relative to the second part, the position signal as a function of said position being a waveform having exclusively monotonically increasing or exclusively monotonically decreasing waveform portions with a transient between every two adjacent waveform portions, the transient having a magnitude and a sign, reference means for generating a reference value, the control means being adapted to generate a switching signal upon the occurrence of each transient in the position signal, the reference means being responsive to the switching signal to subject the reference value to a correction of a magnitude and sign the same as the magnitude and sign of the transient, a comparator for generating an error signal which is a measure of a difference between a parameter of the position signal and the reference value, the parameter being an actual value of the position signal, and energizing means for energizing the motor in dependence upon the error signal.

2. A drive system as claimed in claim 1, wherein the reference means are adapted to generate a reference value in dependence upon time and a target signal.

3. A drive system as claimed in claim 1, wherein
the position signal as a function of the position is a sawtooth-shaped waveform, the reference means comprise a digital counter which indicates the reference value and which is incremented or decremented with a step size at a step frequency, and wherein at least one of the step size and the step frequency depends on the target signal.

4. A drive system as claimed in claim 1, wherein
the measurement system comprises at least two sensors for supplying a sensor signal which is dependent upon the position of the second part relative to the first part, the control means comprise a status generator for generating a status signal in dependence upon actual values of the sensor signals, and the control means comprise a multiplexer for deriving the position signal from the sensor signals in dependence upon the status signal.

5. A drive system as claimed in claim 4, wherein each of the sensors comprises a Hall element on the first part and a permanent magnet on the second part and adjacent the Hall elements flux guides are provided to guide flux of the permanent magnet.

6. A drive system as claimed in claim 5, wherein
the motor comprises a drivable part which comprises the permanent magnet, and the motor further comprises stator poles carrying windings, each Hall element is disposed in a plane of symmetry of a stator pole, and the measurement system comprises first correction means for correcting for crosstalk from a first stator pole to a Hall element facing a second stator pole by means of a compensation signal which is directly proportional to current through the winding associated with the first stator pole.

7. A drive system as claimed in claim 4, wherein the measurement system comprises a memory for storing a maximum value and a minimum value of each of the sensor signals and the measurement system comprises second correction means for correcting each sensor signal on the basis of the stored values.

8. A control system for use in a drive system for driving an electric motor, comprising:

a measurement system for generating a position signal which is defendant on a position of a first part relative to a second part, the position signal as a function of said position being a waveform having exclusively monotonically increasing or exclusively monotonically decreasing waveform portions with a transient between every two adjacent waveform portions, the transient having a magnitude and a sign, reference means for generating a reference value, the control system being adapted to generate a switching signal upon the occurrence of each transient in the position signal, the reference means being responsive to the switching signal to subject the reference value to a correction of a magnitude and sign the same as the magnitude and sign of the transient, a comparator for generating an error signal which is a measure of a difference between a parameter of the position signal and the reference value, the parameter being an actual value of the position signal, and energizing means for energizing the motor in dependence upon the error signal.

9. An apparatus for the storage and/or reproduction of information, comprising a head for writing information on an information carrier and/or reading information stored on an information carrier and a drive system for positioning the head relative to the information carrier, the drive system including a motor and a control system therefor, the control system including a measurement system for generating a position signal which is defendant on a position of a first part relative to a second part, the position signal as a function of said position being a waveform having exclusively monotonically increasing or exclusively monotonically decreasing waveform portions with a transient between every two adjacent waveform portions, the transient having a magnitude and a sign, reference means for generating a reference value, the control system being adapted to generate a switching signal upon the occurrence of each transient in the position signal, the reference means being responsive to the switching signal to subject the reference value to a correction of a magnitude and sign the same as the magnitude and sign of the transient, a comparator for generating an error signal which is a measure of a difference between a parameter of the position signal and the reference value, the parameter being an actual value of the position signal, and energizing means for energizing the motor in dependence upon the error signal.

10. A method of controlling a motor in a drive system having a first part and a second part driven relative to the first part by means of the motor, the method comprising the steps of:

generating a position signal which is dependant upon the position of the second part relative to the first part, generating a reference value, adapting the reference value upon an occurrence of a transient, having a magnitude and sign in the position signal by applying a correction of a magnitude and sign the same as the magnitude and sign of the transient, generating an error signal which is a measure of a difference between an actual value of the position signal and the reference value, and energizing the motor in dependence upon the error signal.

11. A control system for use in a drive system for driving an electric motor, comprising:

a measurement system for generating a position signal dependant on a position of a part moved by the motor, the position signal having exclusively monotonically increasing or exclusively monotonically decreasing portions with a transient having a magnitude and a sign between adjacent waveform portions, reference means for generating a reference value including a correction having a magnitude and sign the same as the magnitude and sign of the transient, a comparator for generating an error signal which is a measure of a difference between a parameter of the position signal and the reference value, the parameter being an actual value of the position signal, and energizing means for energizing the motor in dependence upon the error signal.

12. A control system as claimed in claim 11 comprising an edge detector which detects the transient in the position signal, the reference means being responsive to the edge detector to provide the correction.

* * * * *